(12) United States Patent
Eo et al.

(10) Patent No.: US 12,730,616 B2
(45) Date of Patent: Sep. 8, 2026

(54) INTEGRATED USER INTERFACE PLATFORM DEVELOPMENT SYSTEM AND METHOD OF SINGLE-PAGE APPLICATION TYPE

(71) Applicant: INSWAVE SYSTEMS CO., LTD., Seoul (KR)

(72) Inventors: Se Yong Eo, Seoul (KR); Woog Lae Kim, Seoul (KR)

(73) Assignee: INSWAVE SYSTEMS CO., LTD., Seoul (KR)

( * ) Notice: Subject to any disclaimer, the term of this patent is extended or adjusted under 35 U.S.C. 154(b) by 160 days.

(21) Appl. No.: 18/551,869

(22) PCT Filed: Mar. 23, 2022

(86) PCT No.: PCT/KR2022/004048
§ 371 (c)(1),
(2) Date: Sep. 22, 2023

(87) PCT Pub. No.: WO2022/203381
PCT Pub. Date: Sep. 29, 2022

(65) Prior Publication Data

US 2024/0201963 A1 Jun. 20, 2024

(30) Foreign Application Priority Data

Mar. 23, 2021 (KR) ........................ 10-2021-0037429
Mar. 22, 2022 (KR) ........................ 10-2022-0035233

(51) Int. Cl.
*G06F 8/38* (2018.01)
*G06F 8/34* (2018.01)
(Continued)

(52) U.S. Cl.
CPC .................. *G06F 8/38* (2013.01); *G06F 8/34* (2013.01); *G06F 8/35* (2013.01); *G06F 8/36* (2013.01)

(58) Field of Classification Search
CPC .................................... G06F 8/38; G06F 8/34
See application file for complete search history.

(56) References Cited

U.S. PATENT DOCUMENTS 10,846,060 B2 * 11/2020 Wu ..................... G06F 16/2365
2017/0187785 A1 * 6/2017 Johnson ................. H04L 51/42
(Continued)

FOREIGN PATENT DOCUMENTS

KR 10-2012-0042291 A 5/2012
KR 10-2014-0055004 A 5/2014
(Continued)

*Primary Examiner* — Asher D Kells
(74) *Attorney, Agent, or Firm* — IP & T GROUP LLP

(57) ABSTRACT

Disclosed is an integrated user interface platform development system and method of a single-page application type. A user interface platform development system may comprise: a development tool which provides a screen file development environment in a WYSIWYG method, and generates a screen file source in which a user interface platform is configured by structured components; a server which provides a resource for developing a screen file by using the development tool and in which a developed screen file source is registered; and a client which includes a client engine for loading the screen file source configured as a single page application type, which is requested to the server and received therefrom as a response, and executes the loaded screen file source in a browser window, so as to provide the user interface platform corresponding to a device associated with the executed screen file source.

7 Claims, 20 Drawing Sheets

(51) Int. Cl.
*G06F 8/35* (2018.01)
*G06F 8/36* (2018.01)

(56) References Cited

U.S. PATENT DOCUMENTS

2018/0225099 A1* 8/2018 Rempell ................. H04L 67/02
2019/0197148 A1* 6/2019 Engstrand ........... G06F 16/2365
2020/0264848 A1* 8/2020 Stober ....................... G06F 8/40
2021/0192106 A1* 6/2021 Bourhani .................. G06F 8/35
2022/0276843 A1* 9/2022 Elzbieciak .............. G06F 9/547

FOREIGN PATENT DOCUMENTS

KR 10-2015-0078840 A 7/2015
KR 10-1807897 B1 12/2017
KR 10-2018-0058561 A 6/2018
KR 10-2124499 B1 6/2020

* cited by examiner

Figure 2:
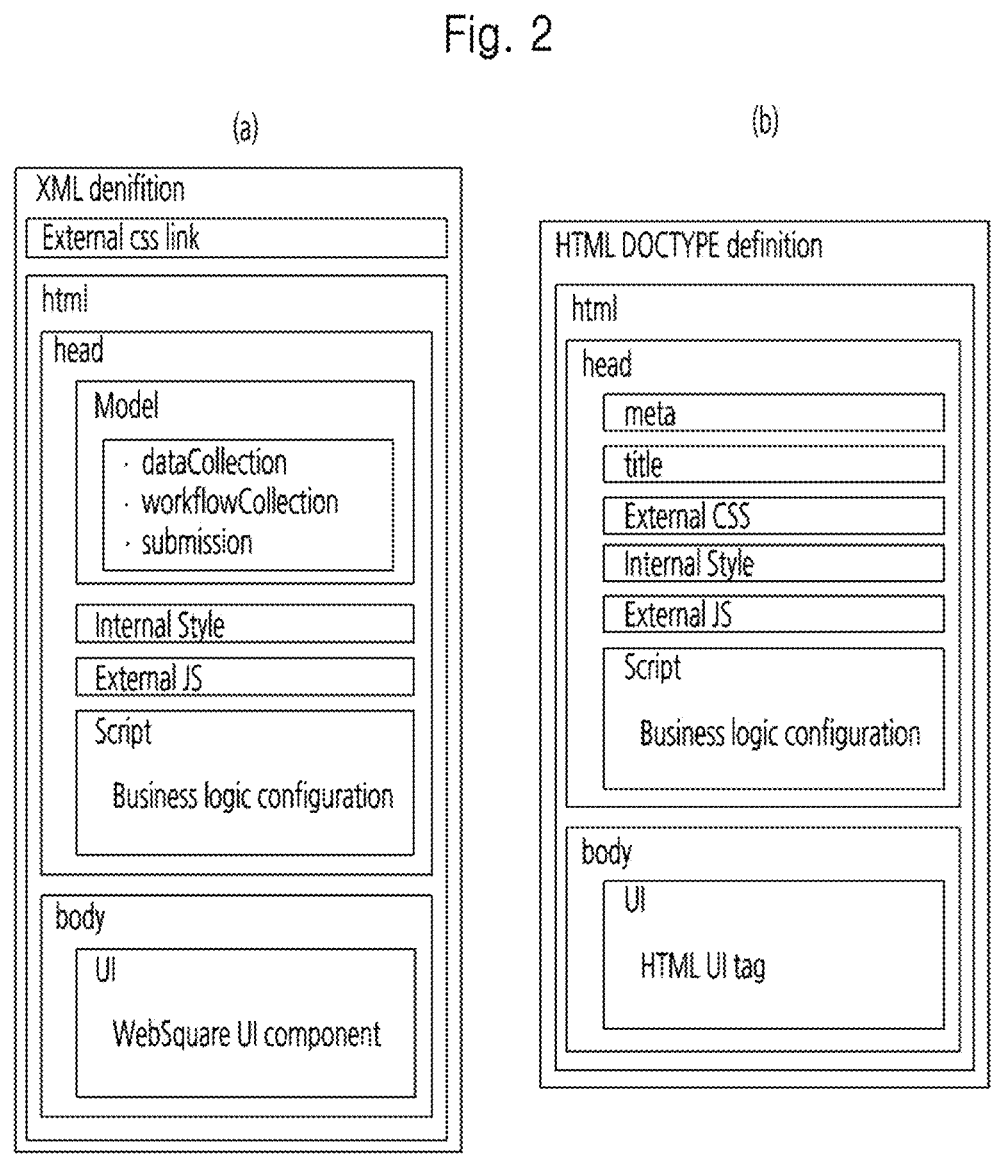

XML denifition

External css link html head

Model

· dataCollection
· workflowCollection
· submission

Internal Style

External JS

Script

Business logic configuration body

UI

WebSquare UI component (b)

HTML DOCTYPE definition html head meta title

External CSS

Internal Style

External JS

Script

Business logic configuration body

UI

HTML UI tag

Fig. 5

Page B

Page A

Page C

Fig. 6

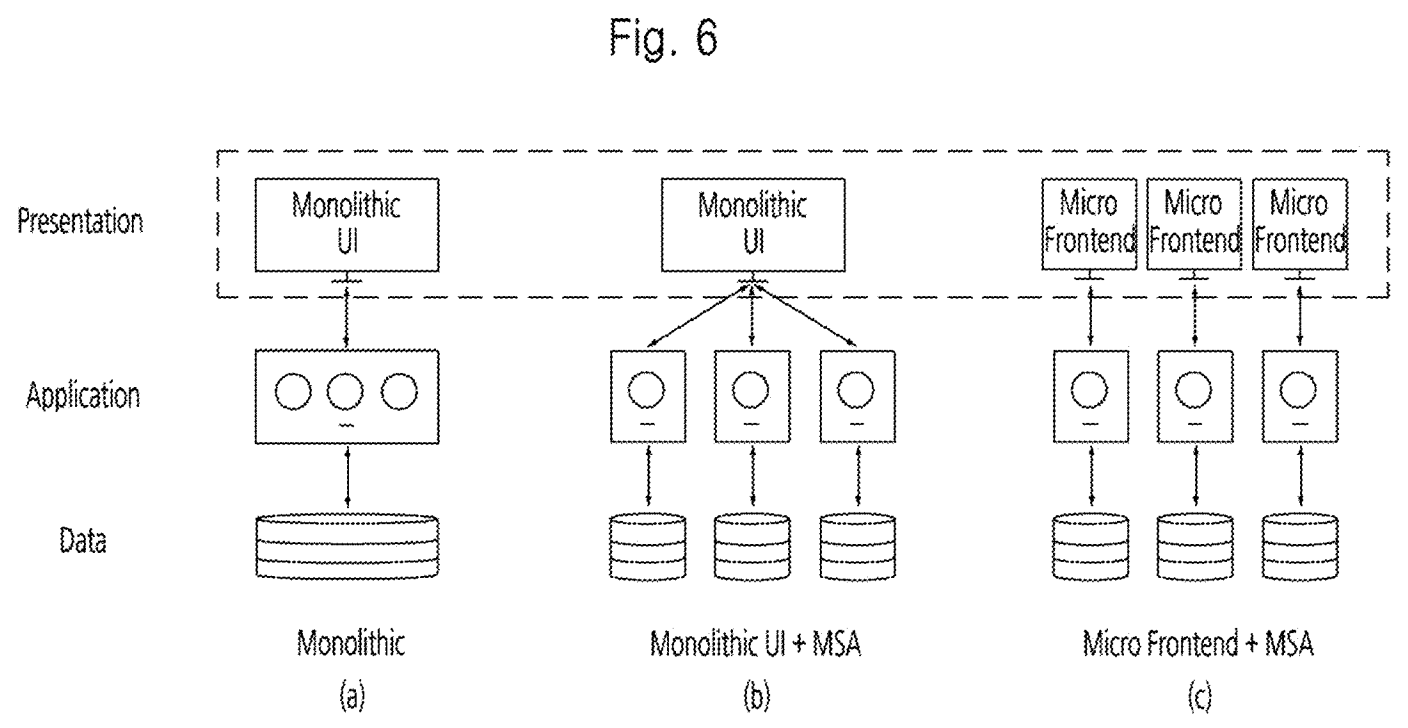

Presentation
Application
Data

Monolithic UI
Monolithic
(a)

Monolithic UI
Monolithic UI + MSA
(b)

Micro Frontend
Micro Frontend
Micro Frontend
Micro Frontend + MSA
(c)

Fig. 7

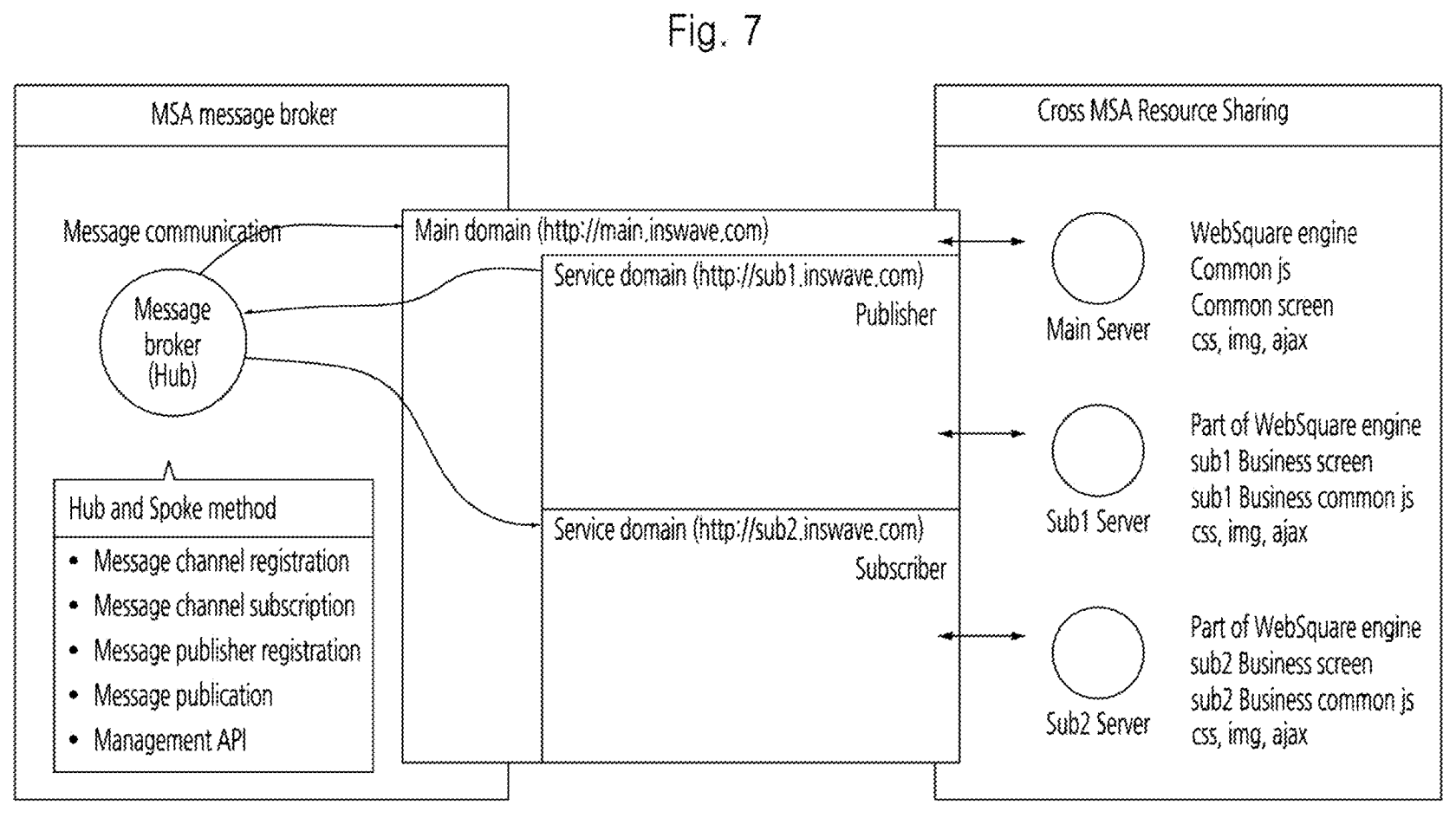

Cross MSA Resource Sharing

Main Server
WebSquare engine
Common js
Common screen
css, img, ajax

Sub1 Server
Part of WebSquare engine
sub1 Business screen
sub1 Business common js
css, img, ajax Sub2 Server
Part of WebSquare engine
sub2 Business screen
sub2 Business common js
css, img, ajax Main domain (http://main.inswave.com)
Service domain (http://sub1.inswave.com)
Publisher
Service domain (http://sub2.inswave.com)
Subscriber MSA message broker Message communication
Message broker (Hub)

Hub and Spoke method
- Message channel registration
- Message channel subscription
- Message publisher registration
- Message publication
- Management API

Fig. 9

<One HTML Page>

Fig. 11
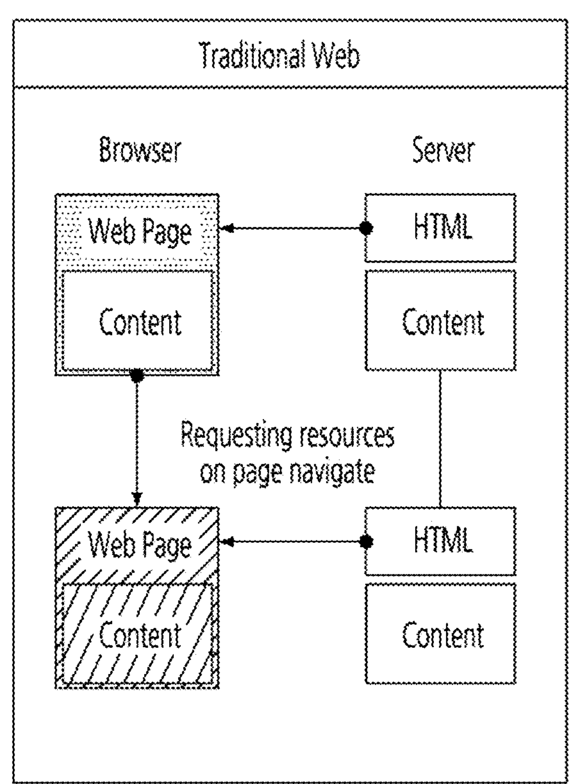
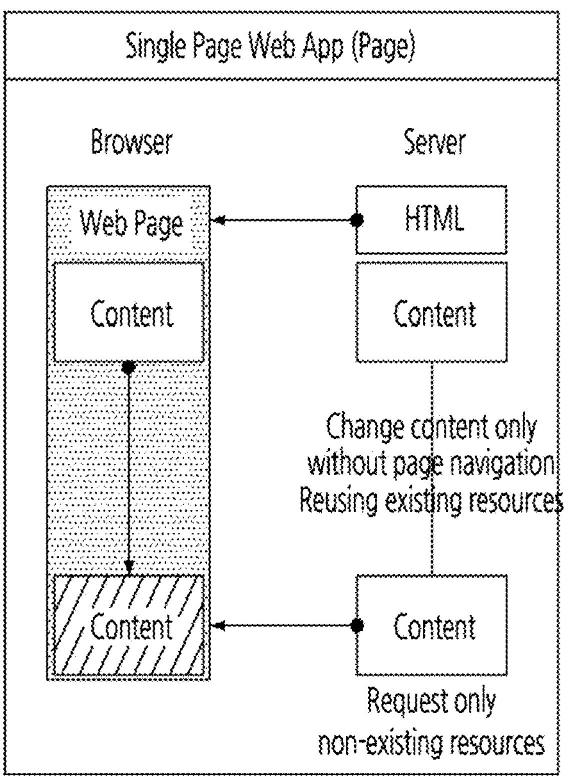
- Reload entire page
- Download static resource on request
- Increased traffic, increased load times
- Rendering part area
- Download static resource once
- Decreased traffic, decreased load times

Fig. 12

No Frame

- Single Document
- Single View

```
. Screen transition

$w.url("/ws5/page/A01.xml",
{spa:true});
```

Frame

- Multiple Document
- Single View

```
. WFrame - Scope property designation

<w2.wframe id="ui_contFrame"
scope="ture" ></w2.wframe>
```

WFrame

Frame + Tab

- Multiple Document
- Single View

```
. addTab - contentsOptions property designation

contentsOptions = {
       src : tabUrl,
       wframe : ture,
       scope : true
};
[TabControl ID].addTab(tabkey,
tabOptions, contentsOptions);
```

TabControl - WFrame mode

Frame + MDI

- Multiple Document
- Multiple View

```
. frameMode property

<w2.windowContainer
id="ui_windowContainer"
frameMode="wframe">
</w2.windowContainer>
```

WindowContainer - WFrame mode

Selecting supported resolution

| 선택 | name | minwidth | maxwidth |
|---|---|---|---|
| ☐ | Desktop | 1024 | |
| ☑ | Tablet | | 1023 |
| ☐ | Mobile | | 480 |

(a)

(b)

Fig. 17
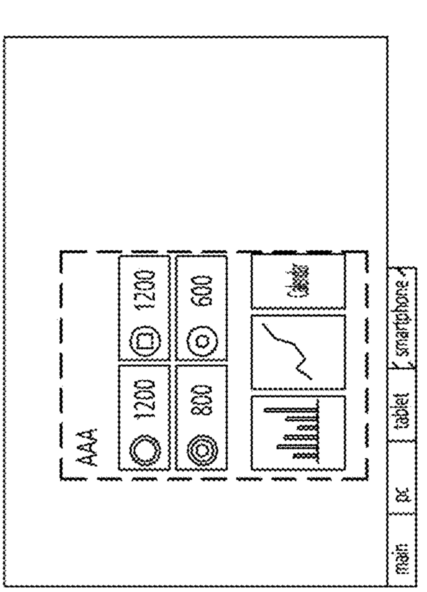
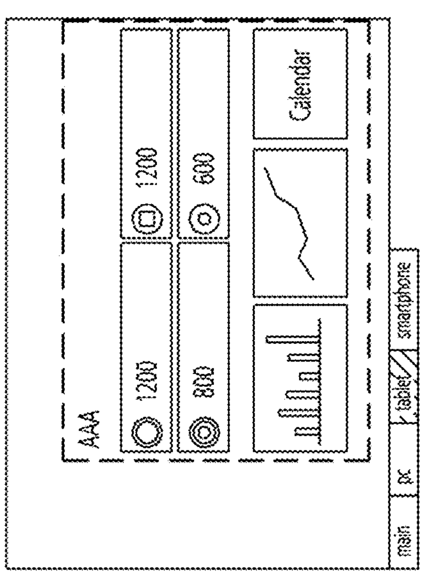

Developer UI standard guideline (Snippets Guide)

| No. | Snippet>Directory name | Snippet file name |
|---|---|---|
| ① | 1_Layout | 1_Content area |
| ② | 2_Tab | 1_Page title |
| ③ | 1_Layout | 3_Content group |
| ④ | 5_Grid | 1_Basic<br>2_Variable-Height |
| ⑤ | 1_Layout | 2_Division 3-7 |

INTEGRATED USER INTERFACE PLATFORM DEVELOPMENT SYSTEM AND METHOD OF SINGLE-PAGE APPLICATION TYPE

This application is a national stage application of PCT/KR2022/004048 filed on Mar. 23, 2022, which claims priority of Korean patent application number 10-2021-0037429 filed on Mar. 23, 2021 and Korean patent application number 10-2022-0035233 filed on Mar. 22, 2022. The disclosure of each of the foregoing applications is incorporated herein by reference in its entirety.

TECHNICAL FIELD

The present invention relates to a single page application-type user interface platform integrated development system and method.

RELATED ARTS

Digital transformation is about innovating the traditional social structure by applying digital technology to society as a whole.

In general, it means that companies are building and utilizing information and communication technologies (ICT) such as the Internet of Things (IOT), cloud computing, artificial intelligence (AI), and big data solutions as platforms to innovate existing traditional operating methods and services.

To digitize and innovate all business processes, there are two essential requirements:

(1) Rapid response to market needs and active use of new technologies (2) Business model innovation using multiple devices (mobile, wearable, IoT)

Adapting to new technologies (AI, IoT, cloud, big data, AR/VR, mobile), utilizing open source ecosystems, and responding to rapid development (low coding) requires multi-experience development platforms (MXDPs) that can integrate all development activities, including web, mobile, wearable device, and app development.

SUMMARY

Technical Objectives

The present invention is to provide a user interface platform integrated development system and method having a microservices architecture based on web standards technology, which supports multi-browser, multi-device and multi-OS with one source multi-use (OSMU), has various and advanced components, provides an integrated development environment, can be flexibly linked with external libraries, and can provide an optimal screen for various web environments and devices.

The present invention is to provide a single page application-type user interface platform integrated development system and method for developing screens in a single page application (SPA) using Page function to operate as one HTML Page regardless of the number of screens, to ensure fast output and performance due to no redundant loading of screen resources, and to enable stable system operation with low memory usage.

Other objectives of the present invention will be readily understood through the following description.

Technical Solutions

According to one aspect of the present invention, there is provided a user interface platform development system, including a development tool, configured for providing a WYSIWYG-style screen file development environment and generating a screen file source that organizes a user interface platform with structured components, a server, providing resources for developing the screen file with the development tool, and with which developed screen file sources are registered and a client, having a client engine to load the screen file source that is received from the server as response, and configured for executing in a browser window to provide the user interface platform according to an associated device, wherein the development tool configures the screen file as a single page application type.

The screen file may have an effective scope set for all unit screens constituting the web page, so that the entire web page may be implemented as one single page.

The screen file may be divided into a static resource and a dynamic resource that make up the web page, wherein when loading the web page in the client's browser, the static resource is downloaded only once, and then the dynamic resource is rendered in a partial area.

In the screen execution process performed by the client, creating a browser window, loading and executing the client engine, loading and executing a common script, and loading a common resource may be executed only once, and loading a screen resource, rendering the screen, and executing a screen script may be subsequently repeated by request.

The component may include at least one of Page component, user defined component (UDC), Project UDC, and MSA UDC.

The client may include a MSA message broker configured for corresponding to a microservice architecture and a micro frontend architecture having a cross-MSA resource sharing function.

Other aspects, features and advantages other than those described above will become apparent from the following drawings, claims and detailed description of the invention.

Effects of Invention

According to an embodiment of the present invention, it is advantageous to support multi-browser, multi-device, multi-OS with one-source multi-use, to be equipped with various advanced components, to provide an integrated development environment, to enable flexible linking with external libraries, and to have the effect of providing an optimal screen for various web environments and devices.

It is also advantageous to develop screens in a single-page application (SPA) by using Page function to operate as one HTML page regardless of the number of screens, to ensure fast output and performance by not redundantly loading screen resources, and to enable stable system operation with less memory usage.

BRIEF DESCRIPTION OF ACCOMPANYING DRAWINGS

FIG. 2 is a diagram comparing the structure of XML code generated by the system according to one embodiment of the present invention to typical HTML code;

FIG. 5 illustrates the componentization of a page;

FIG. 6 illustrates various server configurations;

FIG. 7 illustrates cross-MSA resource sharing function and MSA message broker function;

FIG. 9 illustrates how data is exchanged between Page components using message brokers;

FIG. 11 is a comparison of a traditional web application and a single-page web application;

FIG. 12 is an example of various implementations of a single-page application;

FIG. 17 illustrates each device tab of layout manager;

DETAILED DESCRIPTION

Figure 1:
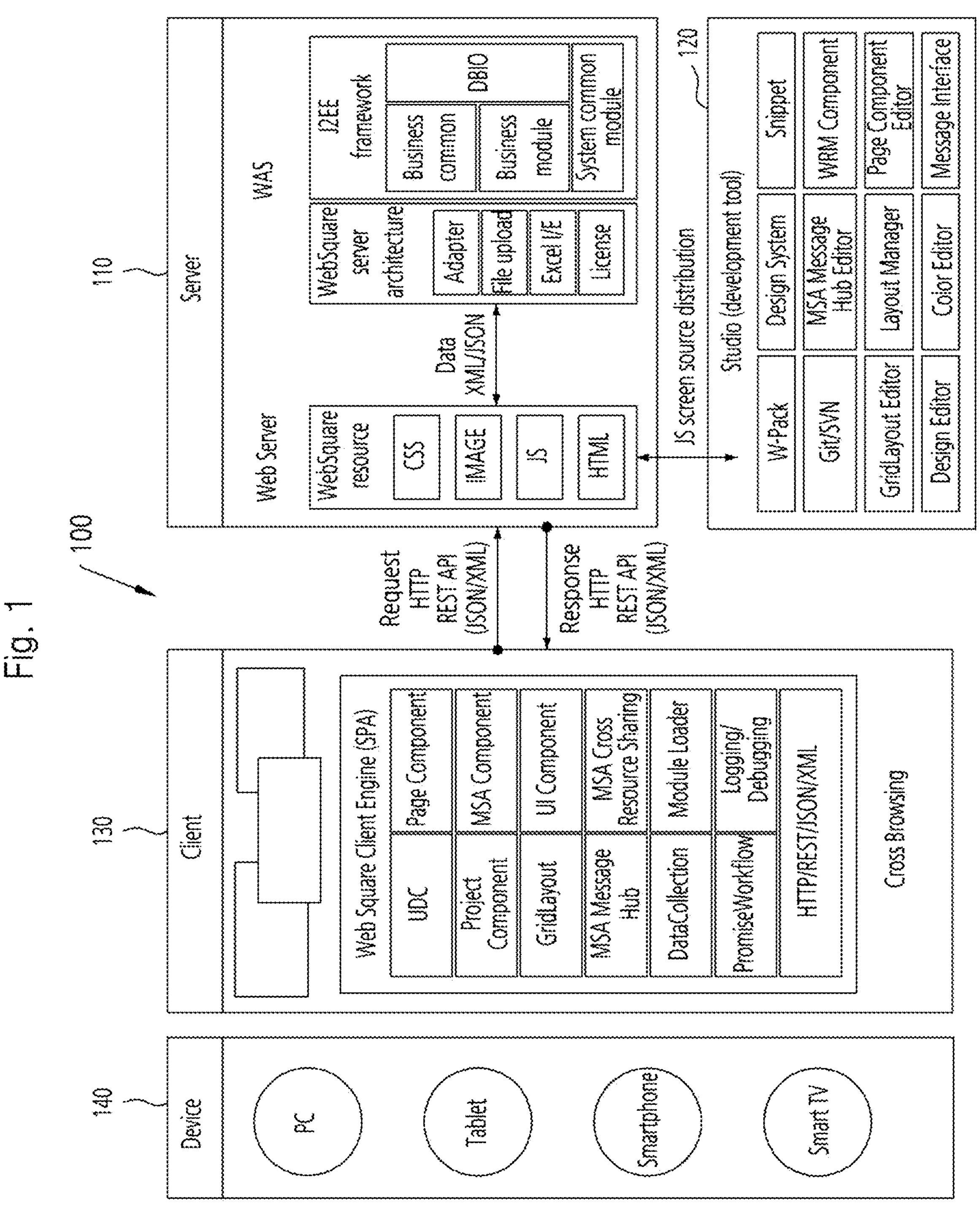
FIG. 1 illustrates the architecture of a user interface platform development system according to one embodiment of the present invention.

The invention can be modified in various forms and specific embodiments will be described below and illustrated with accompanying drawings. However, the embodiments are not intended to limit the invention, but it should be understood that the invention includes all modifications, equivalents, and replacements belonging to the concept and the technical scope of the invention.

If it is mentioned that an element is "connected to" or "coupled to" another element, it should be understood that still another element may be interposed therebetween, as well as that the element may be connected or coupled directly to another element. On the contrary, if it is mentioned that an element is "connected directly to" or "coupled directly to" another element, it should be understood that still another element is not interposed therebetween.

Terms such as first, second, etc., may be used to refer to various elements, but, these element should not be limited due to these terms. These terms will be used to distinguish one element from another element.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

Elements of an embodiment described below with reference to the accompanying drawings are not limited to the corresponding embodiment, may be included in another embodiment without departing from the technical spirit of the invention. Although particular description is not made, plural embodiments may be embodied as one embodiment.

In describing the invention with reference to the accompanying drawings, like elements are referenced by like reference numerals or signs regardless of the drawing numbers and description thereof is not repeated. If it is determined that detailed description of known techniques involved in the invention makes the gist of the invention obscure, the detailed description thereof will not be made.

Terms such as ~ part, ~ unit, ~ module mean an element configured for performing a function or an operation. This can be implemented in hardware, software or combination thereof.

Figure 3:
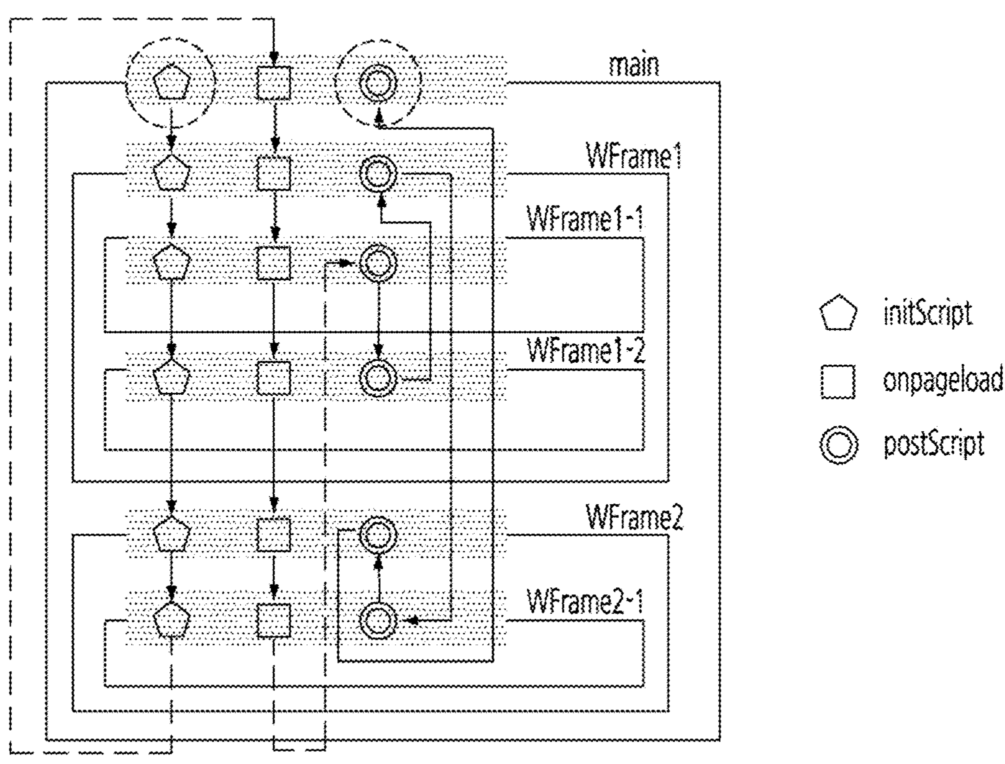
FIG. 3 illustrates a script execution sequence when the main screen contains nested wframes.
Figure 4:
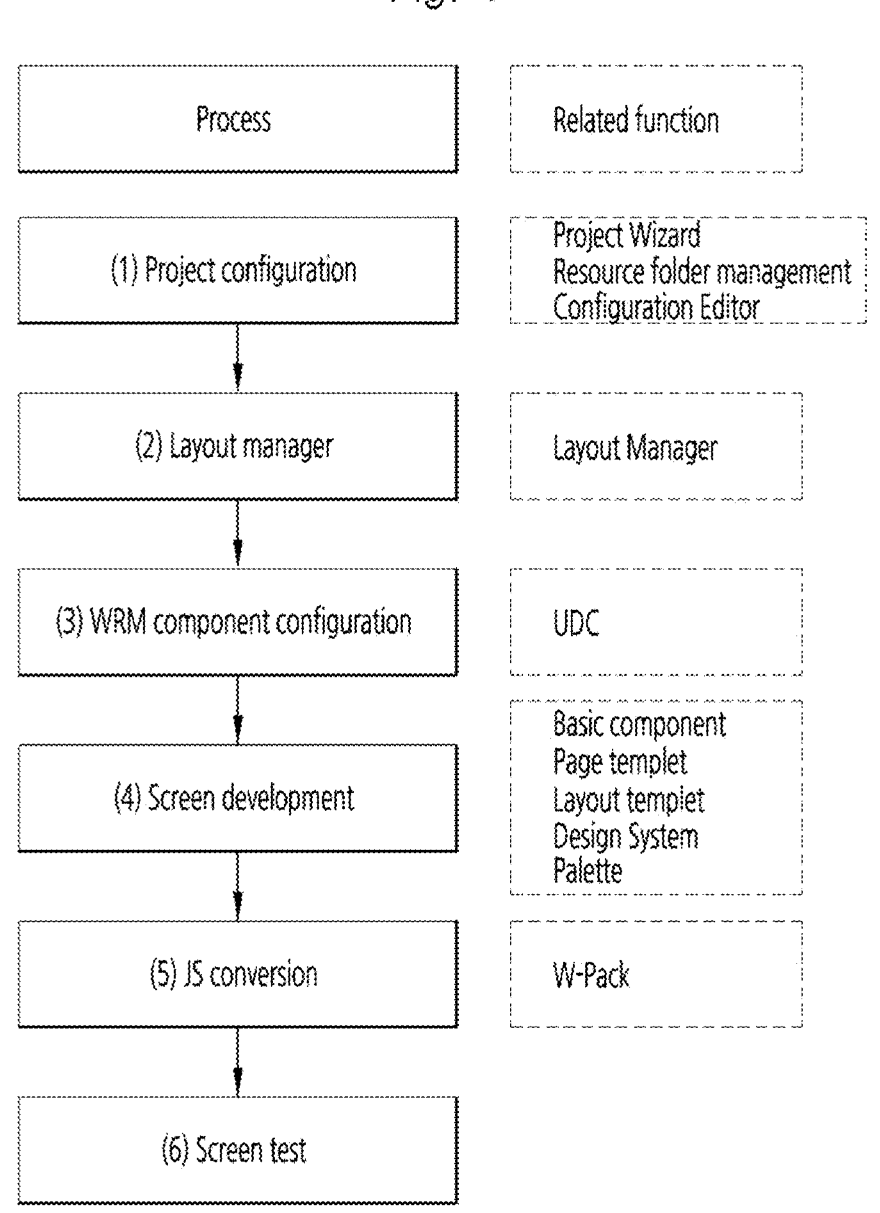
FIG. 4 is a flowchart of a user interface platform development method according to one embodiment of the present invention.
Figure 5:
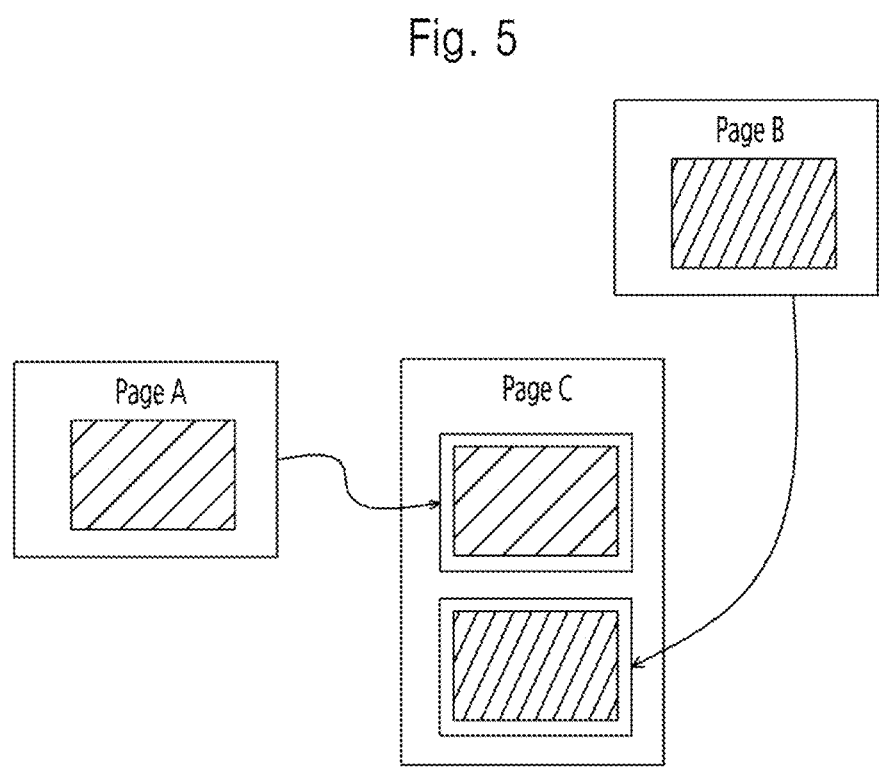

FIG. 1 illustrates the architecture of a user interface platform development system according to one embodiment of the present invention, FIG. 2 is a diagram comparing the structure of XML code generated by the system according to one embodiment of the present invention to typical HTML code, FIG. 3 illustrates a script execution sequence when the main screen contains nested wframes, FIG. 4 is a flowchart of a user interface platform development method according to one embodiment of the present invention, and FIG. 5 illustrates the componentization of a page.

The user interface platform development system 100 according to one embodiment of the present invention supports various smart device and web browser environments of clients, and the server environment supports platform independence for any web application server (WAS) supporting Java 2 Enterprise Edition (J2EE), any framework, any operating system (OS), and the like.

Hereinafter, the user interface platform development software according to the present embodiment will be referred to as WebSquare developed and marketed by the present applicant.

The user interface platform development system 100 may include a client 130 used by a user, a development tool 120 used by a developer (sometimes referred to as a "studio"), and a server 110 that responds to requests from the client 130 and enables the development tool 120 to develop WebSquare screen files.

The development tool 120 provides an environment in which developers can develop WebSquare screen files related to business systems. A client engine is installed in the client 130, and the client engine displays the WebSquare screen file in the browser.

Client 130 is written in JavaScript and based on AJAX architecture. It supports dynamic execution of UI components such as grids, charts, etc. It may include utilities for communication and other UI related functions.

The client engine contained in the client 130 may have a Single Page Application (SPA) architecture.

The client engine may include modules such as UDC, Page component, Project component, MSA component, grid layout, UI component, MSA message hub, cross-MSA resource sharing, data collection, module loader, promise workflow, logging/debugging, etc.

Components are basic files that can be used to develop Pages, Project UDCs, MSA UDCs, UDCs, and TTCs. All screens in the business system can be composed of structured components to support efficient operation that can be reused anywhere.

WebSquare Page component is a basic screen file used in component form. Newly added Project UDC, MSA UDC, UDC, and TTC are supported. XML is used as the extension.

UDC stands for User Defined Component, which is registered to a palette in the studio.

TTC stands for Trust Third-part Component and supports the use of external solutions as WebSquare Page components.

Project UDC is a common function file that contains common functions used throughout the Project. It is defined in a WebSquare environment setting and is automatically loaded when a WebSquare engine is loaded.

MSA UDC is a common function file that contains common functions to support micro-frontends. It is defined in the WebSquare environment setting and loads resources from the server where the microservice is running when the corresponding WebSquare engine is loaded.

Components may include built-in components, SP4 UDC components, and WebSquare components.

GridView is a built-in component, and may include Grid, Table, Combo, Input, and TabControl. This component is provided by default in WebSquare.

SP4 UDC components may include SP4 UDC and SPC TTC. As a user-defined component standard, the UDC can be added by a developer on his own. And TTC is an added component products through collaboration with solution manufacturers.

WebSquare components include UDC, TTC, Project UDC, and MSA UDC. UDC and TTC are Page-based user-defined components introduced to increase the reusability of UI elements (Pages) developed by developers. All Pages can be developed as components by simplifying/structuring existing Pages (XML). It can be modularized by lowering the degree of coupling between Pages.

A Project UDC is a global UDC, a component that can be called from any screen. It can be used to develop common business UDCs to maximize reuse.

MSA UDC is a UDC for micro frontend implementation, which applies MSA and enables cross-domain processing.

Data Collection is a module for intuitive, consistent, and convenient data management in the form of tables. It provides an API similar to the Grid component, allowing developers to easily manipulate data in a grid format.

Promise Workflow makes programming asynchronous processing simple and easy with an intuitive GUI that makes it less complicated and difficult to develop with HTML5.

The Server 110 stores application resources (images, HTML, JS, CSS, XML, etc.). The server architecture may include utilities for adapters, file upload/download, Excel I/E (import/export), and license management. It may also include business common, business module, DBIO, and system common module as modules for framework interface.

The server 110 may be implemented independently of the OS, DBMS, and WAS to support platform independence.

Development Tool 120 provides a WYSIWYG-style integrated development environment and can support developers for easy development. A developer can draw components, add scripts, view screens, debug, etc. all at once through the development tool 120.

In addition, the development tool 120 may perform SCM (Software Configuration Management) using SVN/CVS/Git. Commercial configuration management solutions can interwork as vendor plug-ins provided by vendors.

Development tool 120 may include modules such as a W-Pack (source compiler), design system, Snippet, Git/SVN, MSA message hub editor, WRM component, grid layout editor, layout manager, Page component editor, design editor, code editor, and message interface. It also supports a reusable common business UDC.

When a client 130 installed on various devices (PCs, tablets, smartphones, smart TVs, etc.) makes a request (HTTP REST API (JSON/XML)) to a server 110, a web server 110 can locate resources, exchange data with a web application server 110 and send a response (HTTP REST API (JSON/XML)) corresponding to the request to the client 130. In the connection between the web server 110 and the development tool 120, JS screen sources may be distributed.

In this embodiment, a micro frontend architecture with MSA message broker and cross-MSA resource sharing capability may be provided to correspond to the microservice architecture (MSA).

In addition, it is possible to improve performance through Single Page Application (SPA), engine optimization (Engine Optimizer), resource optimization (W-Pack), and support for processing large amounts of data.

Through its open architecture, it can support any web application server, any framework, any OS, and improve development productivity through open source reuse. It also supports easy integration of various open/commercial libraries and supports integration with various security solutions.

Structures of XML code generated by WebSquare and typical HTML code are compared in (a) and (b) of FIG. 2.

The two main components of WebSquare XML code are the <head> and <body>.

<head> includes <xf:model>, <script>, and <style> elements.

<xf:model> includes <w2:dataCollection>, <xf:workflow>, and <xf:submission> areas.

<w2:dataCollection> is an area that defines data objects, including DataMap, DataList, and LinkedDataList. It defines request and response data for server communication and data to be used on the screen.

<xf:workflow> defines an execution sequence of submit and submitDone. It is used when executing multiple Submissions. It defines the execution sequence, result processing sequence, whether to execute subsequent Submission according to the result, etc. It is recommended to use it for communication for the purpose of inquiry (Select).

<xf:submission> defines submit required for service call. Each submit contains a unique ID. As an interface for server communication, multiple definitions are possible for each purpose. It is possible to select a communication method (synchronous/asynchronous), and it is possible to define a function to be executed before/after communication. Data to be transmitted (request or ref) and data to be received (response or target) can be set.

<script> can configure a business logic by defining global scripts and event functions of components.

<style> specifies the style.

<body> includes components, component properties, and screen UI information. As a screen UI information, information about component arrangement and configuration, and properties of each component may be included.

In case of creating WebSquare Page components in this embodiment, the script execution sequence is external JS file→local script→<initScript>→onpageload→<postScript>.

If the main screen contains a nested WFrame, the execution sequence of script is as shown in FIG. 3.

W-Pack that is a source compiler can build screen sources in JavaScript. The screen file developed by the development tool 120 is generated in XML format, and W-Pack converts it into a JavaScript file optimized for the browser environment.

By providing compression and minification (Minify) functions, the file size can be reduced compared to the typical XML format. Obfuscation can be used to increase the security of the source code. JS files optimized for the web environment have shorter loading times and less memory usage compared to XML, so client engines can draw screens on the browser faster by using JS files.

The screen created by the development tool 120 is created as an XML file and converted into JS file by W-Pack, and the XML file name is displayed in the browser, but the file actually used when displaying the screen is the JS file.

The browser's screen calling sequence is as follows:

(1) Browser calls the screen (2) Websquare.html file of the WebSquare engine on the server side is called (3) WebSquare engine is running (4) XML file corresponding to the screen is called with URL (5) JS file converted by W-Pack is loaded (6) The corresponding screen is displayed in the browser The user interface platform development system 100 according to this embodiment provides a variety of common development resources. As a highly complete resource that can be used immediately, it can be provided in the form of a thumbnail image. Developers can intuitively check the template and use the resource easily with just a mouse click without any coding process.

Common development resources may include Page templates (selectable when creating screen files), layout templates (selectable when creating screen files), and Snippets (provided through thumbnail images in the design system).

Referring to FIG. 4, the present system can provide wizards, managers, editors, etc. for each stage according to the development process, and can provide common resources suitable for each stage. By following a development process, a design consistency can be maintained and common resources can be reused as much as possible.

In addition, the present embodiment allows for modularized development. Screen files to be developed can be used in the form of components. When a specific screen is registered and used as a UDC or Project component, it can be reused. When the registered UDC is modified, the changes are reflected in batches, which improves a development productivity and a maintenance efficiency.

Screen files developed in this system can be used in component form (Page component) and support all functions of existing Page files. When a Page is registered as a UDC and used as a common component, a UDC description document can be created based on the annotations on the UDC API, and an auto-completion function for the UDC API can be used in a script editor.

All Pages can be registered as components, and Pages registered as components can be used in other screen development with a simple click.

FIG. 5 illustrates componentization of a Page used for Page C by componentizing Page A and Page B.

In this embodiment, the design system may display design-related resources including Snippets used for common development in the form of thumbnails in the studio (development tool). Developers can easily check the design, add the desired design to the screen, and use it.

Resources such as various samples and templates used for common development can be easily used and managed. Resources are categorized by type and stored in different folders, and developers can manage those folders themselves. In addition, various resources reflected in the screen development process are provided in the form of thumbnail images, and developers can conveniently select and use available resources for each development stage.

In addition, GUI to configure both server and client environments in the studio is provided. Without knowledge of configuration items, it is possible to edit by referring to the description provided by the editor ((1) client.config.xml, (2) server.config.xml).

The studio's design system is a module for organic collaboration between developers and publishers. Design-related resources are displayed as thumbnail images. Developers can intuitively check the design and copy the desired design resources to the screen file with just a click.

The screen of the development tool provides a WYSIWYG-style component design space, allowing developers to draw the component selected in the palette view. And the property, configuration and style of the component can be edited in the Property, Component and Style views.

When drawing components, Static mode and Absolute mode are provided.

In Static mode, in a click-and-click method, a component to be added is selected in the palette view, a position to be added is designated in the design view, and then drawing is performed by click. The position of the new component is determined based on the selected component in the design view. The rendering sequence is determined according to the position specified when creating the component.

In Absolute mode, drawing is performed by selecting a component to be added in the palette view and dragging the component in the design view in a click-and-drag method. The position is determined by dragging in the design view, and the rendering sequence follows the drawing sequence of the components.

All components include ID, style, and css properties. Developers can extend each component style using CSS syntax.

The screen file can be developed through the development tool 120 by setting properties, functions, events, etc. of about 80 basic components provided by WebSquare and common development components such as UDC, and using common design resources (Page templates, layout templates, Snippets) provided by WebSquare.

Single-Page Application (SPA) is a web application or site that attempts a single-page operation for quick page transitions. A web application or site with an SPA doesn't download repetitive HTML code again, allowing for faster page navigation and more efficient resource management.

Page navigation speed is improved, and WebSquare resources (engine files, CSS, image files, etc.) and external JS files that have already been loaded are reused.

The user interface platform development system according to this embodiment is a multi-experience UI platform and has the following characteristics.

It is characterized by architecture advancement using microarchitecture. MSA message broker, a UI architecture for implementing micro-frontend without direct Page-to-Page reference, is implemented. In addition, all Pages are componentized, and global component architecture for Project UDC and screen modularization, and component architectures such as MSA UDC and micro frontend support component architecture are implemented.

It also has the feature of improving development productivity using studio (especially layout manager, design system, script editor, etc.). The design system is an intuitive developer/designer collaboration tool for maintaining design consistency. The script editor supports the latest JavaScript syntax, supports auto-completion (IntelliSense), and can provide basic VS Code functions.

It also has performance optimization features that improve user experience by optimizing loading speed with SPA structure enhancement, and enhancing IE initial loading speed with W-Pack and screen browser optimization.

It also has features that coding by providing reusable common business UDC and WRM is reduced, common development modularization is performed through property, method, and event setting, and common developer man-hour is reduced with a common component with high completeness that can be immediately applied to the development site.

Figure 8:
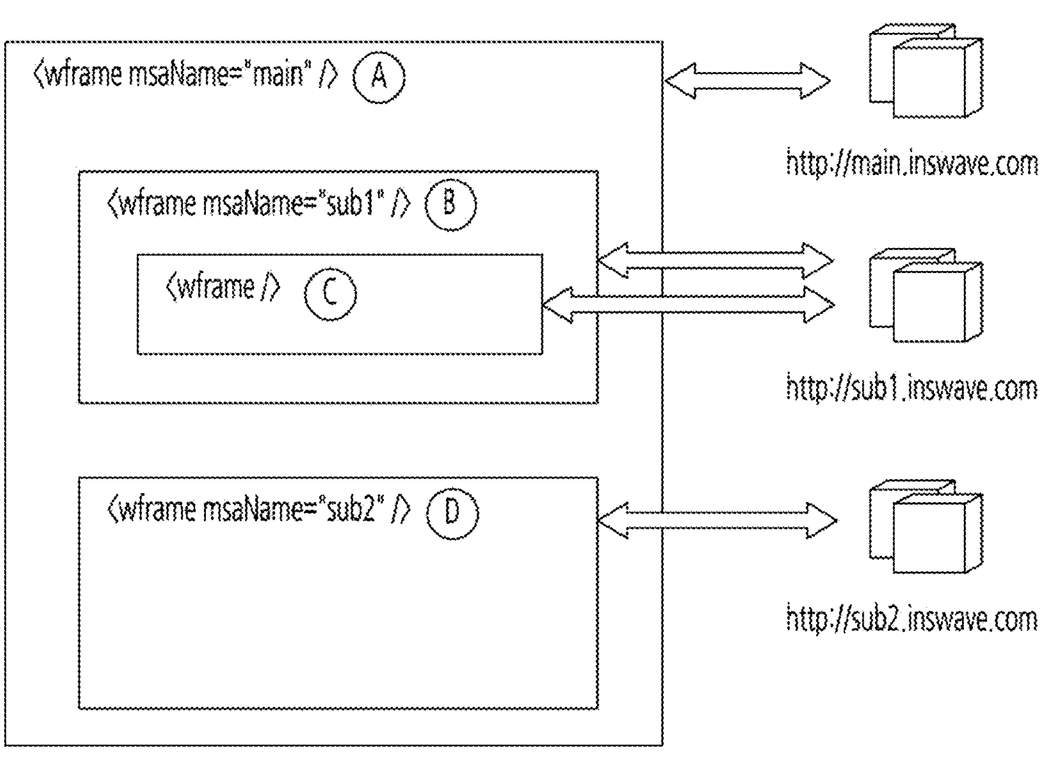
FIG. 8 illustrates operations of the cross-MSA sharing structure when wframe is configured.
Figure 9:
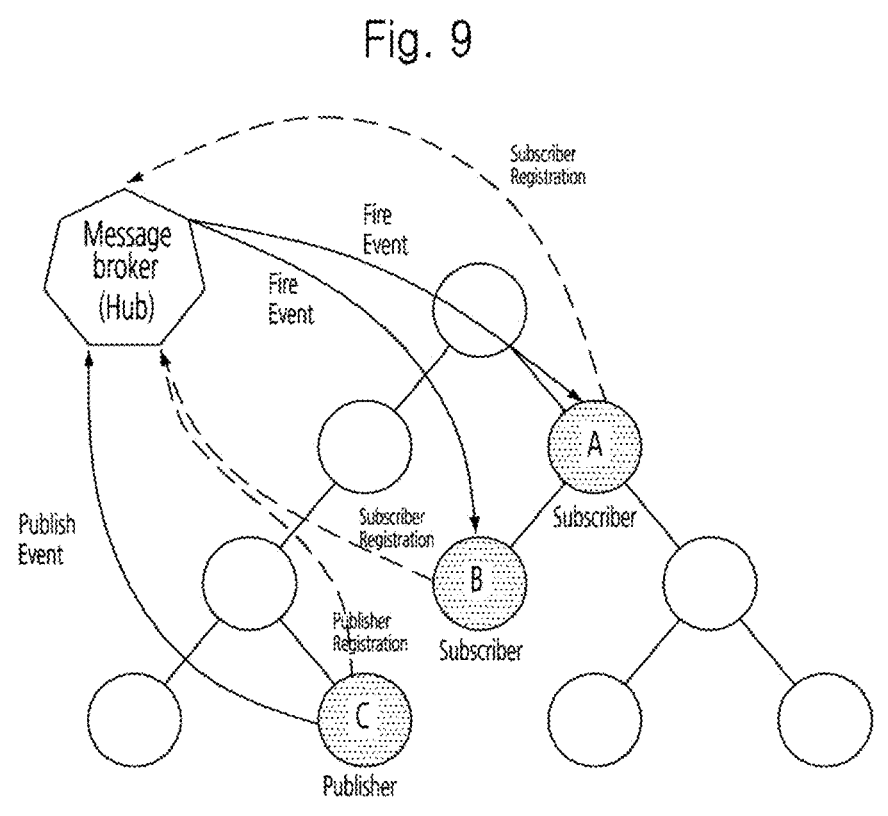

FIG. 6 illustrates various server configurations, FIG. 7 illustrates cross-MSA resource sharing function and MSA message broker function, FIG. 8 illustrates operations of the cross-MSA sharing structure when wframe is configured, and FIG. 9 illustrates how data is exchanged between Page components using message brokers.

In this embodiment, a server may be configured in a micro service architecture (MSA) method. Even in this case, it is common to construct a web-based UI in a monolithic manner.

Microservice architectures start processing data and logic on the server side, but in many cases the UI is still handled monolithically (FIG. 6(*b*)). However, in the micro frontend technique, an application UI is designed according to microservices. That is, a microservice is deployed on the server, and the monolithic client app has a composite UI created from the microservice instead of using the microservice (FIG. 6(*c*)). In this way, microservices can be completed using both logical and visual representations.

In this embodiment, the micro frontend supports a two-step process.

Step 1: Individual UI configuration by microservice using wframe and MSA UDC

Step 2: Support to operate different versions of the client engine and Project UDC used in the screen area configured by microservices Referring to FIG. 7, to implement a system comprising MSA, the client engine may include the cross-MSA resource sharing module capable of fetching necessary resources from multiple servers to configure a screen, and MSA component capable of exchanging data between services (MSA message broker) while eliminating (minimizing) dependencies between UI elements (Pages).

The following is a definition of terms for convenience of understanding and description of the invention.

Main domain: It indicates the host address part of the URL of the current page. If the current page is http://store.company.com/dir2/other.html, store.company.com is the current domain. It is the same value as document.domain that was not changed by script.

Service Domain: It indicates the host address of the server where MSA service is running.

In the case of cross-MSA resource sharing module, it can be implemented to satisfy the following functional requirements in order to fetch resources from multiple servers.

Page components located in the service domain must be able to be loaded into wframe. Unless otherwise specified (msaName, etc.), CSS and JS referenced by Page components located in the service domain must be loaded from the corresponding service domain. Unless otherwise specified (msaName, etc.), the UDC and wframe loaded from Page component located in the service domain must be loaded from the corresponding service domain. Unless otherwise specified (msaName, etc.), the submission called by Page component loaded from the service domain must send a request to the corresponding service domain. Unless otherwise specified (msaName, etc.), $p.ajax should send a request to the service domain of $p.

These are also applicable to images, CSS, and JS.

MSA UDC in the client configuration file must be loaded from the designated service domain. It must be able to load Page components from other service domains or from the main domain. It must be able to call submission and $p.ajax to other service domains or main domains. In order to minimize source code changes in the development/test/operating environment, the addresses of the main domain and service domain must be stored in the client configuration file.

The functional requirements for MSA message broker function to exchange data between services while minimizing dependencies are as follows.

To exchange data between different services, the following functions should be provided based on the pub-sub model. A global message hub accessible from all services must be provided. Registering a message channel in the global message hub only allows Project UDCs and MSA UDCs that can be accessed globally. Data must be delivered as messages in an asynchronous manner. To prevent security and memory leak issues, messages are only allowed in text format (only string converted (stringfy) JSON strings are allowed, not JSON Objects). Each service exchanges data by subscribing to a message channel and publishing a message.

Cross-MSA resource sharing structure is as follows.

An architecture that supports MSA is provided through msaCommon setting in config.xml. Same functions are provided in wframe, windowContainer (MDI), tabControl, widgetContainer, popup (frameMode='wframe'), MSA UD, and UDC components provided by this system.

The request domains of Page components and submission are selected according to the following principle.

Domain Selection Principle

If there is no msaName, the service domain of the high-level Page is used (msaName is searched from low-level to high-level Page).

The top-level page uses the same domain as the html file and is referred to as the main domain.

If msaName is set, the service domain is set by referring to msaServer in config.xml.

Subject to which the Domain Selection Principle is Applied

Individual components that support msaName, such as wframe and windowContainer

When loading resources such as JS and CSS in a system-provided way

When sending a request to the server, such as submission or $p.ajax

When wframe is configured as shown in FIG. 8, the operation is as follows.

A, B, and D have msaName set on their pages, so requests are sent to the set domain.

If the msaName is not specified as in C, the high-level Page with the specified msaName is searched, the Page component (xml file) is loaded from that domain through the specified msaName, and a submission request is sent to that domain. Therefore, C sends a request to http://sub1.inswave.com following B's msaName.

CORS access requires additional HTTP header settings. Additional information required for the HTTP request header is set in the client engine, but the HTTP response header must be set directly in that Project.

Cross-MSA resource sharing function settings are as follows.

The msaServer node can set multiple msa under it, and each domain can be set through the msa node.

The msaCommon node is a setting for loading MSA UDC, a common module provided by the MSA server, and consists of name, resource path, and MSA server name.

The msaStylesheet node is a setting for loading CSS provided by the MSA server and consists of a resource path and MSA server name. css set in msaStylesheet is loaded according to the sequence in which files are set.

```
<projectCommon>
  <module src="/cm/component/common.xml" name="$c.common"/>
  <module src="/cm/component/menu.xml" name="$c.menu"/>
</projectCommon>
<msaServer>
     <msa baseUrl="https://admin.inswave.com"
     w2xHome="/websquare" name="admin"/>
     <msa baseUrl="https://order.inswave.com"
     w2xHome="/websquare" name="order"/>
</msaServer>
<msaCommon>
     <module src="/cm/component/adminBase.xml"
     name="$c.adminBase"
msaServerName="admin"/>
     <module src="/cm/component/code.xml" name="$c.order"
     msaServerName="order"/>
</msaCommon>
<msaStylesheet>
     <module src="/cm/css/admin__common.css"
     msaServerName="admin"/>
     <module src="/cm/css/order__common.css"
      msaServerName="order"/>
</msaStylesheet>
```

| Node | Properties | Description |
|---|---|---|
| //msaServer | — | Top-level node that makes up MSA server |
| //msaServer/msa | — | Node for setting MSA server information |
| | baseUrl | Domain URL |
| | w2xHome | websquare referential path |
| | name | msa's name, msa support component<br>Set msa by specifying msaName |
| //msaComon | | Top-level node that makes up MSA UDC |
| //msaCommon/module | src | Path where MSA UDC is installed |
| | name | The global name to access the MSA UDC, which must begin with $c. It is recommended to match the src filename to everything except $c. in name. |
| | msaServerName | Specifies the MSA server name specified in //msaServer/msa/@name |
| //msaStylesheet | | Top-level node that makes up MSA CSS |
| //msaStylesheet/module | src | Path where MSA CSS is installed |
| | msaServerName | Specifies the MSA server name specified in //msaServer/msa/@name |

The download method of Page components (xml) using the cross-MSA resource sharing function is as follows.

| Container component | Download method |
|---|---|
| wframe | It should support both xml specified in src property of wframe, and xml via the API.<br>Add msaName property.<br>To support dynamic loading using API, wframe and msaLoad (src, msaName, obj, callback) methods are supported. |
| tabControl | It should support both xml specified in src property of content component, and xml via the API.<br>Add msaName property to content component.<br>To support dynamic loading using API, add msaName property to contOpt parameter of addTab |
| windowContainer | Add msaName property to object parameter of creatWindow method. Not support listing parameters. |
| Widget | Add msaName property to object parameter of addWidgets method. |
| Popup | Add msaName property to options parameter of $p.openPopup method. |
| UDC require | Add msaName property to w2.require. Development tool support is tentative. |

The resource download method using the cross-MSA resource sharing function is as follows. Downloads the types of resources listed in the following table that are required for screen rendering.

| Extension | Download method |
|---|---|
| js | When requesting js with $p.js API<br>Add the msaName property to the $p.js API to send a request to that domain.<br>js defined in screen xml<br>If screen xml is subject to MSA, a request is sent to that domain.<br>If wframe is hierarchical, the msaName is searched up to high-level and a request is sent to the domain corresponding to the first searched msaName. |
| image | Image component image<br>Unless otherwise set (msaName), image component used in websquare Page component loaded from the service domain must send a request to the service domain.<br>msaName property is supported in image components,<br>Send a request to the domain using msaName value. |
| Css | css registered in config.xml<br>download from a server in which websquare installed.<br>css defined in screen xml<br>If screen xml is subject to MSA a request is sent to that service domain.<br>If wframe is hierarchical, the msaName is searched up to high-level and a request is sent to the domain corresponding to the first searched msaName. |

-continued

| Extension | Download method |
|---|---|
| Image defined in css | Image defined as a relative path inside the css file Background-image: url(../uiplugin/windowContainer/images/bg_bottom.gif): Provides the ability to compile CSS using sass (scss) to apply msa |

Image processing defined within CSS is as follows.

In case of downloading css from another domain, if an image inside css is called, the image is found on the server that requested the css, and a 404 error occurs. In this case, it is not possible to control the image path, so css compiling technique should be applied. css compilation function can be provided through SASS.

Sass (Syntactically Awesome StyleSheets) is a CSS preprocessor, and is an extension of CSS to create CSS that is more readable and advantageous for code reuse by supplementing the limitations and disadvantages of CSS. SASS support modules can add function to W-Pack modules.

Cross-MSA resource sharing function supports Ajax communication. It is possible to support directly setting msaName in $p.ajax, submission.

If msaName is not set, the operation is as follows.

submission: Use the service domain (set in/msaServer/msa@baseUrl as the MSA address used to download Page components). Even when created dynamically, it operates the same way. However, when a submission is dynamically created in external JS, the request is forwarded to the main domain.

$p.ajax: Use the service domain that created $p object (MSA address used to download Page components, set in/msaServer/msa@baseUrl). However, when executing $p.submission in external JS, the request is forwarded to the main domain.

It is possible to support servlets such as Excel and file upload/download by sending wq requests and jsp requests using the service domain. However, when dynamically creating a component in external JS or executing API that calls wq, such as $p.download, in external JS, the request is forwarded to the main domain.

Next, the implementation method of MSA message broker is as follows. The global DataCollection function is not provided.

Provides a hub-and-spoke MSA message broker.

The MSA message broker consists of a message channel, a message publisher, a message subscriber, and other APIs.

The message channel is registered in Page component to be used as Project UDC. Message channels registered in Page components other than Project UDC are ignored.

Message publishers and message subscribers can be registered in all Page components.

Message subscribers generates onmessage event.

The message publisher can be accessed through a message publisher ID and provides a send method.

The message hub is set in/head/msa/messageChannel in PCC file and can be registered/edited/deleted in an outline view of the development tool.

(a) Message Channel Registration (Channel Registration)

A message channel is created in Project UDC and MSA UDC. It is created as message channel in/head/MSA/channels/channel node, and a message channel ID (channel used for message subscription and publishing) property is required.

(b) Message Channel Subscription (Subscription)

In order to receive messages from the MSA message broker, Page component must subscribe to the message channel. Message channel subscription information is created in/head/MSA/subscribers/subscribe node, including properties such as message subscriber ID, message channel ID (channel ID to subscribe to the message), message occurrence event (registering an event handler to handle when a message is generated) are required.

(c) Message Publisher Registration (Publisher Registration) and Message Publishing (Publish Event)

In order to publish a message to the MSA message broker, a message publisher should be first registered and then a message can be published using the message publisher ID. Message publisher registration information is created in /head/MSA/publishers/publisher node, and properties such as message publisher ID, message channel ID (that is channel ID to subscribe to message, and a combination of the global variable used when accessing a project UDC or MSA UDC and ID used for channel registration) are required.

(d) Management API

The scripts inside Project UDC and MSA UDC that created the message channel can access API used to manage the message channel. The methods provided are as follows.

| Method name | return | Description |
|---|---|---|
| getSubscribers | [{id. // ID used for registration url, // Websquare Page component url uuid // uuid used for managing subscription in channel }, { ... }, ... ] | Return subscriber information list |
| getPublishers | [{id. // ID used for registration url, // Websquare Page component url uuid // quid used for managing subscription in channel }, { ... }, ... ] | Return publisher information list |
| removeAllSubscriber | | Delete all subscriber |
| removeAllPublisher | | Delete all publisher |

Figure 10:
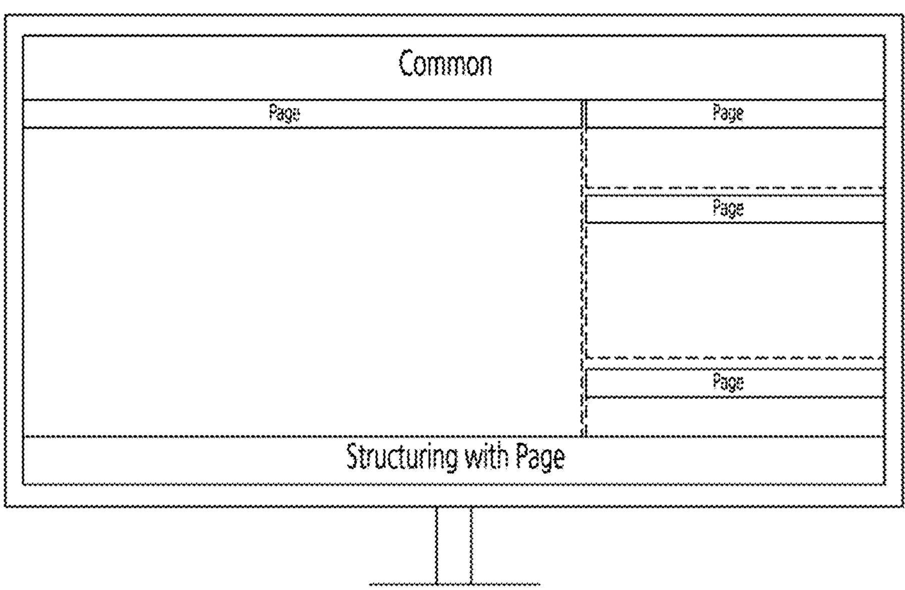
FIG. 10 illustrates structuring a single page using Page.
Figure 13:
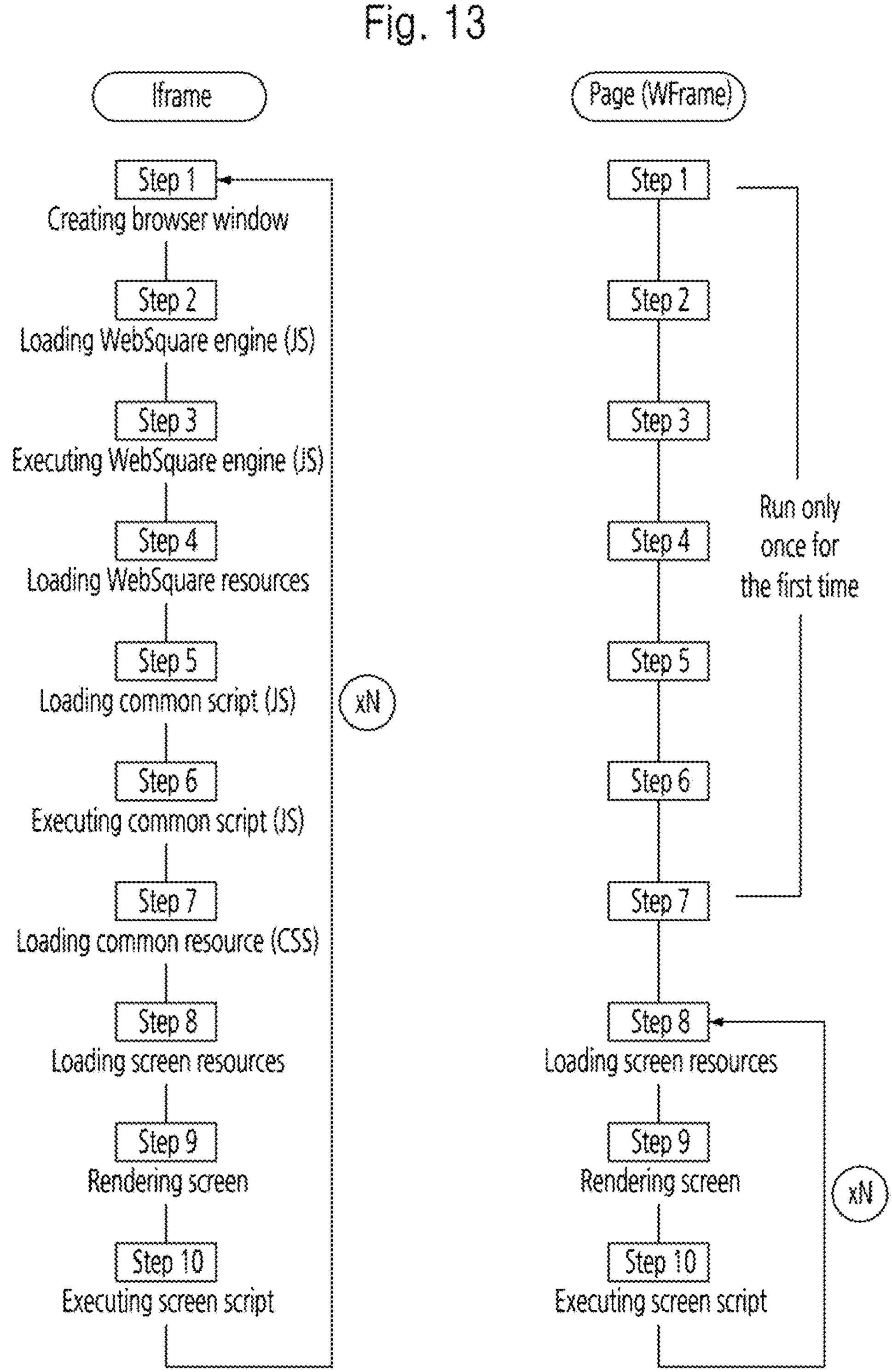
FIG. 13 illustrates a screen display process of a single-page web application versus a traditional web development approach (Iframe).

FIG. 10 illustrates structuring a single page using Page, FIG. 11 is a comparison of a traditional web application and a single-page web application, FIG. 12 is an example of various implementations of a single-page application, and FIG. 13 illustrates a screen display process of a single-page web application versus a traditional web development approach (Iframe).

If a screen is developed using the traditional web development method (iframe mode), the browser's default memory usage increases in proportion to the number of screens, and application memory usage increases due to redundant loading of screen resources, which may cause errors due to memory leaks (screen whitening phenomenon).

In an embodiment of the present invention, Single Page Application (SPA) is utilized to solve this problem. Rather than requesting the entire page from the server after it is loaded in the browser, it is a web application that loads the entire page once for the first time and can only be used by changing the data from then on.

If a screen is developed using SPA method using Page function, it operates as a single page (One HTML Page) regardless of the number of screens. There is no redundant loading of screen resources, ensuring fast output and performance, and stable system operation is possible with less memory usage.

When a developer develops a screen file, the development tool 120 configures the screen file as Single Page Application type.

Screen files distinguish between static and dynamic resources that make up a web page. Static resource can include browser windows, client engines, common scripts, and common resources. Dynamic resources are various contents included in a web page and may be screen resources.

When a browser loads a web page, static resources can be set to be downloaded upon the first request.

Additionally, dynamic resources are a portion of content that includes a portion that must be displayed on the current screen through partial area rendering, and can be set to be displayed through script execution after being loaded and rendered only when requested.

Page is a web technology that loads pages without switching screens. Page consists of a single page, and compared to a traditional dynamic web page (Traditional Web), it can provide improved user experience (UX) by quickly switching between pages, reducing server traffic, and maintaining the flow of site use.

For traditional dynamic web pages, the entire page is refreshed. Static resources are downloaded with each request, increasing traffic and loading time.

In comparison, in the case of Single Page Application (SPA), a partial region is rendered. Static resources are downloaded only once. Only content can be changed without switching pages, and existing resources can be reused. Since it is sufficient to request only resources that do not exist, traffic is reduced and loading time is reduced. In the case of components that dynamically add content, SPA screens can be developed using Pages rather than iframes.

Scope option can solve the problem of global object name duplication between pages dynamically added using Page.

Scope is a function that sets an effective scope of all unit screens that make up a web page. Since all screens exist in scope units, objects and scripts included in the Scope are valid only within the Scope.

When using Scope function, developers can implement the entire web page as a Single Page. Usually, IFrames are used on a frame-by-frame basis, but IFrames have the disadvantage of increasing memory load because the browser is reloaded each time they are used. WFrame, which operates as an independent unit, can replace the existing IFrame, and developers can improve the overall performance of web applications by minimizing the use of IFrame.

Scope-related APIs are as follows.

In $p, main returns a scope object corresponding to the top page in the current window. $ receives a jQuery selector as an argument and returns a jQuery object. If an ID selector is received as an argument, if a WebSquare object with that ID exists on the page, it is converted to the actual ID of the WebSquare object and then executes the function.

In $p.debug, getScope receives a dom object as an argument and returns Scope object of the page where the dom is located. getFrame receives a dom object as an argument and returns the WFrame ID of the page where the dom is located.

In WFrame, getWindow returns Scope object of WFrame. It is possible to access objects in the WFrame screen through this object.

In TabControl, getWindow returns Scope object of the tab corresponding to idx. idx must be a valid tabID or tabIndex value.

In WindowContainer, getFrame returns a frame object (iframe or wframe) of the window corresponding to windowId.

The main APIs of WFrame are as follows.

getWindow returns Scope object of WFrame. To access objects in the wframe screen, this function should be called. getSrc returns the address of the page currently included in the WFrame. setSrc dynamically changes the WFrame screen to the screen corresponding to that url. remove completely removes the wframe.

When Page is applied, improved performance can be achieved by reducing the client's resource (memory) usage when creating a browser window, loading and executing the WebSquare engine, common scripts, and common resources.

Loading methods in iframe mode and Page (WFrame) are compared in the drawing.

The screen execution process performed on the client includes creating a browser window (step 1), loading WebSquare engine (step 2), running WebSquare engine (step 3), loading WebSquare resources (step 4), loading common scripts (step 5), executing common script (step 6), loading common resources (CSS) (step 7), loading screen resources (step 8), rendering screens (step 9), and executing screen script (step 10) are sequentially included.

In iframe mode, (number of screens+1) browser windows (main window, iframe window, popup window) and (number of screens+1) WebSquare engines are required.

In comparison, in WFrame mode, it is sufficient for steps 1 to 7 to be executed only once, so one browser window (main window) and one WebSquare engine are sufficient.

Therefore, screen loading speed can be improved and memory usage can be reduced.

Figure 14:
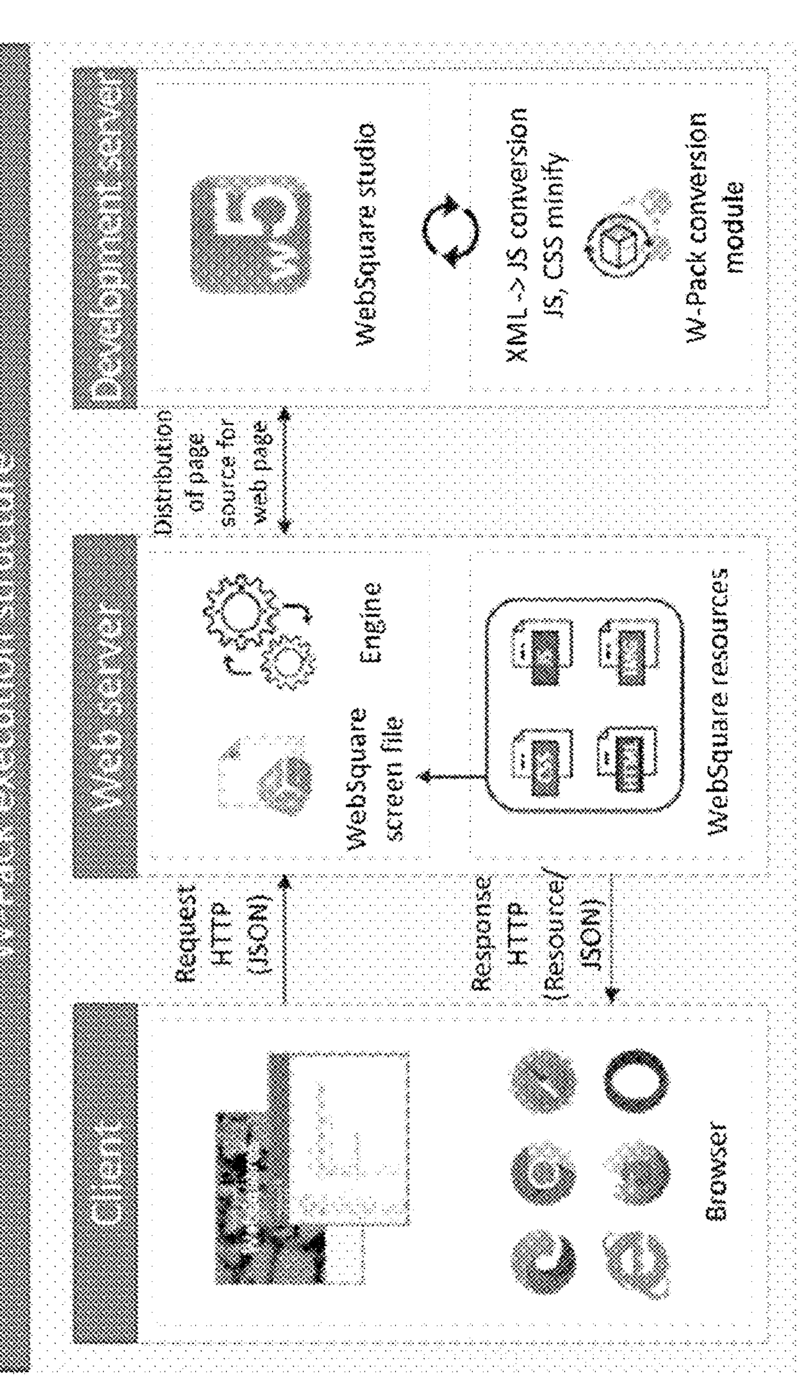
FIG. 14 illustrates W-Pack execution structure.
Figure 15:
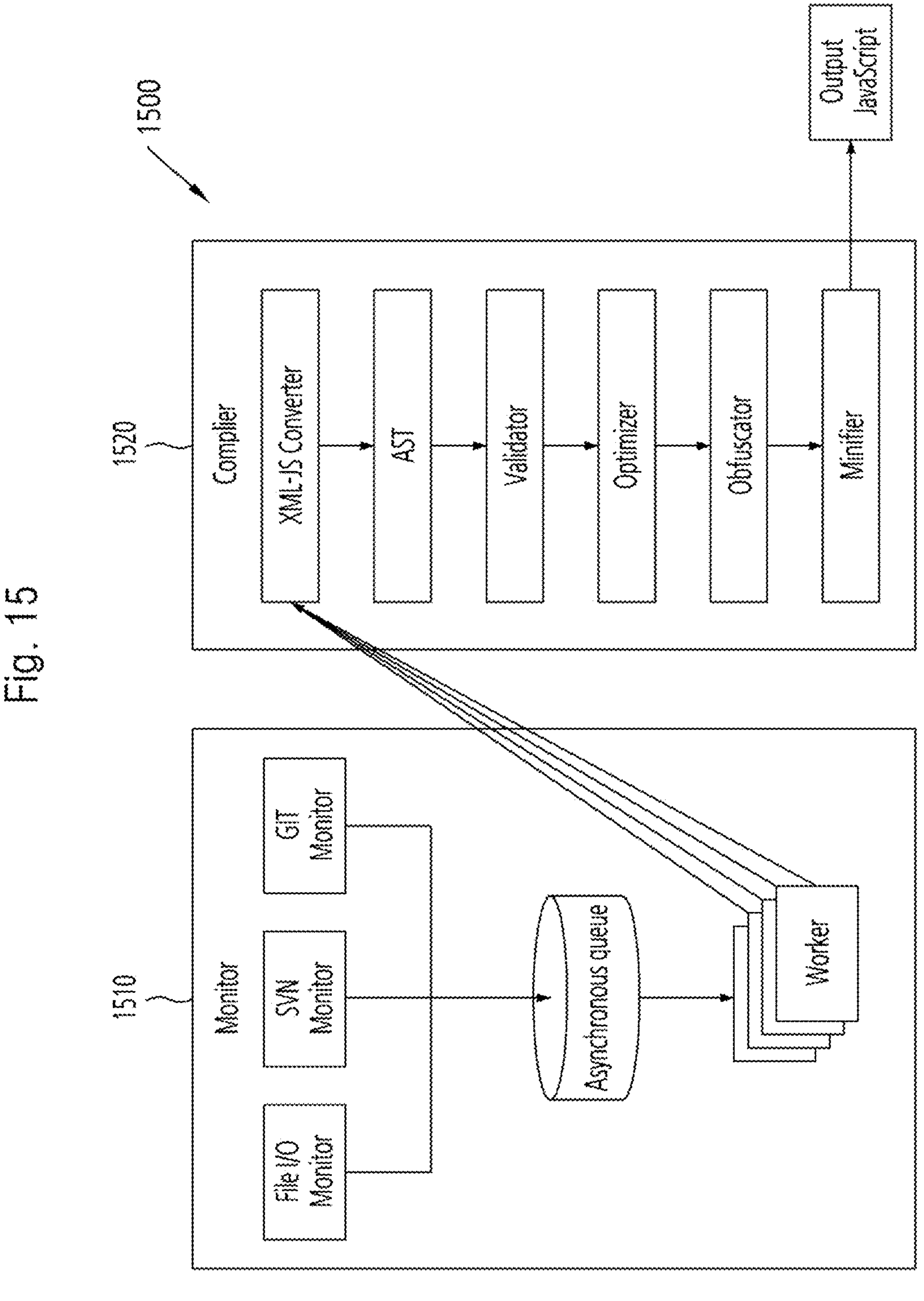
FIG. 15 illustrates a detailed configuration of screen source conversion module.

FIG. 14 illustrates W-Pack execution structure, and FIG. 15 illustrates a detailed configuration of screen source conversion module.

W-Pack, a source compiler, is a screen source conversion module that bundles and transpiles screen source (XML) into JavaScript. WebSquare engine can provide script conversion, obfuscation, and minimization functions so that it can draw the screen using JavaScript.

The screen source conversion module 1500 creates a JS file containing JSON, which has the same information as the screen source XML, and changes WebSquare engine to draw the screen while parsing JSON. The screen source conversion module 1500 traverses XML nodes and converts them into JSON format.

Referring to FIG. 15, the screen source conversion module 1500 may include a monitor unit 1510 configured for monitoring the screen source to be converted, and a compiler unit 1520 configured for compiling the screen source to be converted into JavaScript.

The monitor unit 1510 may include monitors such as a file input/output monitor, SVN monitor, and GIT monitor, an asynchronous queue in which the screen source monitored through the monitor is queued, and a worker to which the screen sources of the asynchronous queue are respectively transmitted. The worker transmits XML type screen source to the compiler unit 1520.

The compiler unit 1520 may include an XML-JS converter configured for converting an XML file into a JS file, a tree generator (AST) configured for generating an abstract syntax tree, a validator configured for verifying the generated abstract syntax tree, an optimizer configured for optimizing the JS file when the verification is successful, an obfuscator configured for applying code obfuscation to the optimized JS file, and a minifier configured for minimizing the obfuscated result through compression and outputs it as JavaScript.

Figure 16:
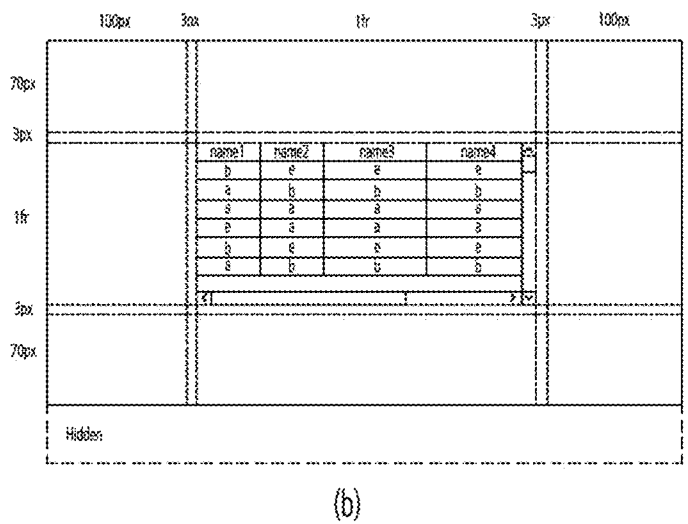
FIG. 16 illustrates a resolution setting screen of layout manager and an example scree of grid layout manager.
Figure 18:
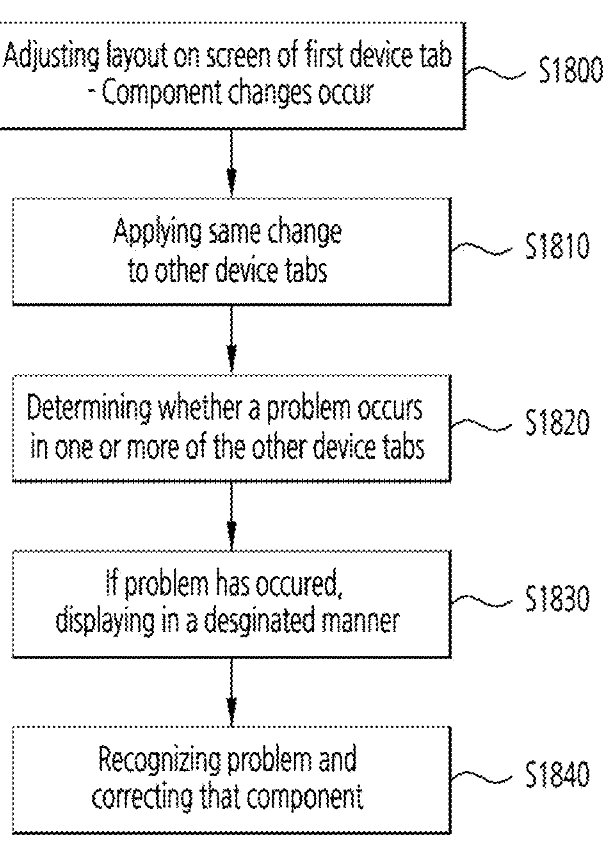
FIG. 18 is a flowchart of screen development method performed in layout manager.

FIG. 16 illustrates a resolution setting screen of layout manager and an example scree of grid layout manager, FIG. 17 illustrates each device tab of layout manager, and FIG. 18 is a flowchart of screen development method performed in layout manager.

The system of this embodiment, especially the development tool 120, may include a layout manager for implementing a responsive/adaptive web. It is possible to set the resolution optimized for the business system and select various types of layout templates.

The layout manager supports easy layout configuration through grid layout components. It can support screen editing and multiple resolutions using CSS3 grid layout standard so that developers can easily edit the screen while complying with web standards.

In order to express a layout that takes into account various devices, it is possible to set and use resolution information and layout information. To do this, it is needed to set media information (media info) for resolution information in client environment settings and to set layout information (layout info) needed by the studio in WebSquare layout.

Media information may include resolution. Resolution can be set in layout component file. It can be implemented as a multi-design tab that supports layout components specified on the page.

Layout information can be saved in Page component file, and the layout file and area to be used for screen rendering can be specified.

WebSquare Page component creates design tabs as many as the number of layout items defined in the layout information to support screen editing in consideration of a device resolution and size of Page component.

The layout manager creates device tabs corresponding to the number of devices being developed. Devices subject to screen development can be individually assigned to each device tab.

On the screen of the device tab, the arrangement of components to be applied to the business system can be displayed as if it were actually displayed on the screen of the device according to the resolution of the device assigned to the device tab. Developers can identify and correct errors in the screen configuration of the business system currently under development through the screen of the device tab.

According to OSMU principle, the components implemented on the screen of all device tabs are identical to each other. However, there are differences in the way it is expressed depending on the resolution of the device.

The layout manager can modify the layout of any component on the screen of the first device tab. In this case, these modifications can be applied equally to other device tabs (second to Nth device tabs).

However, in this case, even if the component is moved to an appropriate position or modified to an appropriate size on the screen of the first device tab without a problem, it may deviate from the intended layout on one or more of the other device tabs due to different supported resolutions, causing problems with screen configuration.

In response to this, the developer can sequentially select each device tab, check the screen of each tab, and modify it one by one. However, during this process, problems may occur in the first device tab, which was previously modified without a problem.

Accordingly, if a change occurs in a component while adjusting the layout on the screen of the first device tab (step S1800), the layout manager automatically applies the same change to other device tabs (step S1810).

Then, it is determined whether a problem occurs in one or more of the other device tabs (step S1820). Referring to FIG. 17, all components are arranged and displayed without problems in the device tabs (a), (c), and (d), but in the device tab (b), the four blocks placed in the center of the screen are not aligned. In this case, it can be determined that a problem occurred in the device tab in (b).

If it is determined that a problem has occurred, it can be displayed in a designated manner so that the developer can recognize the possibility of a problem occurring in relation to the component he or she wants to change within the screen of the first device tab being viewed (step S1830). The specified method may be to display the component in a pre-designated color (e.g. red), make the component blink, or repeatedly expand and contract the size of the component.

By displaying this notification, the developer can recognize that a layout problem may occur in a device other than the first device with respect to the component currently being edited, and correct it immediately and collectively (step S1840).

Figure 19:
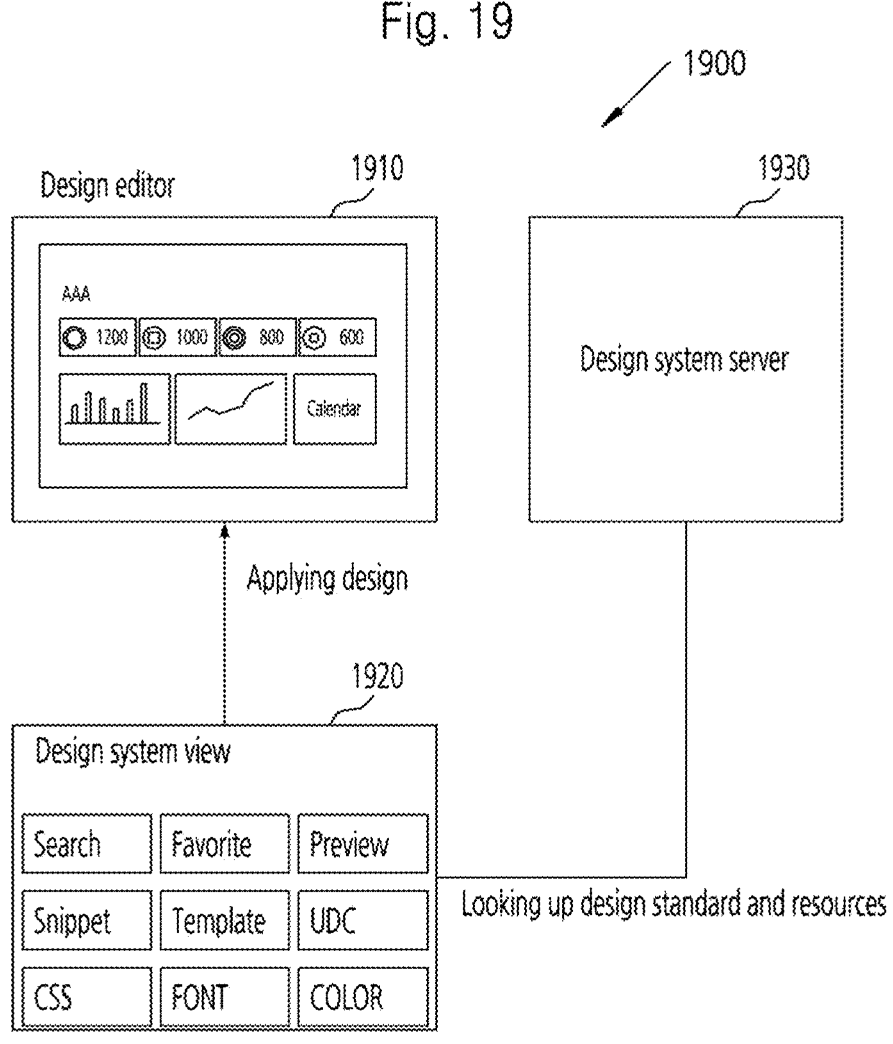
FIG. 19 illustrates a configuration of design system.
Figure 20:
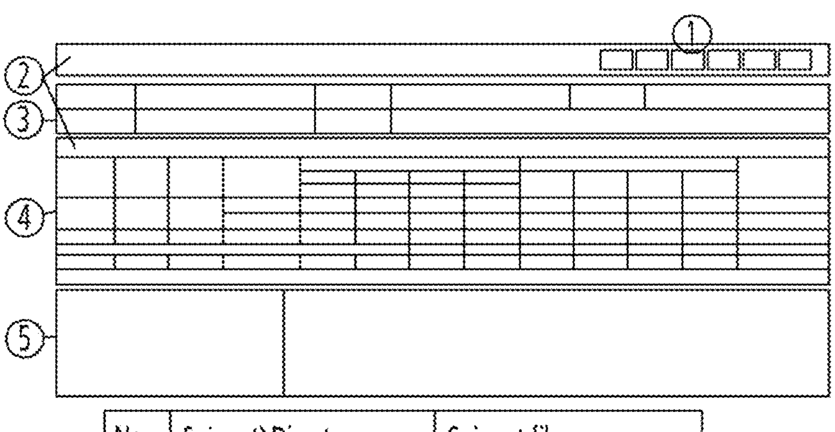
FIG. 20 illustrates an example of using a Snippet guide and template.

FIG. 19 illustrates a configuration of design system, and FIG. 20 illustrates an example of using a Snippet guide and template.

The design system is a module to strengthen collaboration between developers and designers. The system contains design style rules or guidelines and commonly used colors, fonts, layouts, and UI components necessary to maintain design consistency on the web or in services.

The design system includes various resources needed by relevant stakeholders such as planners, designers, and developers. Among them, there are resources that are used by all stakeholders, such as design patterns and design guides, but development productivity can be further improved by providing resources such as CSS, components, layouts, and templates that are mainly used by developers and publishers.

CSS is the common CSS needed to maintain design consistency and is provided in CSS or SCSS form. Components provide source codes such as HTML, web-components, React, and Vue, together with buttons and input forms. Layout provides source code related to screen layout such as Flex, Grid, and Stack. Templates provide source code related to frequently used screen types.

The design system module 1900 is a collection of functions necessary for publishers and developers to develop with WebSquare while maintaining design consistency. The design system module 1900 is a function of WebSquare Studio to help develop applications.

The design system module 1900 consists of elements such as a design system view, common CS, UDC, Snippet, and template. In particular, the design system view supports UDC and Snippet-related parts by embedding them in WebSquare studio.

Design system view is a built-in web browser that can visually express UDC and Snippets and load web pages with visual images and descriptions. HTML and related resources containing visual images and descriptions of UDC and Snippets can be saved in the project and loaded into the design system view.

Design system view is a dependent function of Eclipse project, and the design system view can be displayed using resources defined in the project containing the currently active WebSquare Editor. In case that files in multiple projects are edited at the same time, when file A is edited, then another file is edited, and then file A is edited again, it can be ensured that the resources of the design system view associated with file A remain in the same state as when file A is first edited (scroll position, page link move, etc.).

CSS, UDC, Snippets, TTC, and basic components can be added to design data. There are APIs such as insertSnippet for adding snippets, insertComponent for adding UDC, TTC, and built-in components, updateSnippetResource for downloading Snippets and reflecting them in the project, and updateUDC for downloading UDCs and reflecting them in the project.

Web pages for the design system can exist locally or remotely. The snippet guide document can be converted into a web page for the design system and displayed in the design system view when setting up UI common template and basic template support.

The design system's resources can be downloaded into the studio.

Communication between the web for design system and Eclipse (RCP) uses messages in JSON format. The msgType of request message called to RCP from the web page of the design system view is "REQUEST", and action defines the function to be processed by RCP. Additional information for each type of action is delivered using req object. All requests can operate in an asynchronous manner.

msgType of response message delivered from RCP to the web page of the design system view is "RESPONSE", action uses the value delivered at the time of request, and the detailed response message is delivered using res object.

Snippet is a fragment template that can be used to improve development productivity and maintenance efficiency by maximizing code reuse. By registering and reusing frequently used or complex source code in advance, duplicate developments are prevented and source codes are standardized to improve development convenience and development productivity.

As shown in FIG. 20, the design system view can display developer UI standard guidelines (Snippets Guide) related to the screen that the developer wants to develop.

① Content area: First step in drawing the screen and is the entire content area.

② Page title: Consisted of a screen path at the top of the screen+a button area on the right, and a title at the top is used as a common wframe.

③ Content group: Areas for each section within the content area

④ Grid: Basic grid

⑤ Split area: Use a layout that divides the content area into two with a certain ratio (e.g. 3:7).

And it is possible to utilize the template through snippet view according to the developer UI standard guidelines.

Referring to FIG. 19, the development tool 120 allows the developer to view the screen under development through the design editor 1910.

Design editor 1910 is connected to the design system view 1920. The design system view 1920 may include function modules such as search, favorites, preview, Snippet, template, UDC, CSS, FONT, and COLOR.

The design system view 1920 can query design standards and resources from the connected design system server 1930.

The design system view 1920 allows designs based on design standards and resources retrieved from the design system server 1930 to be applied to the screen being edited in the design editor 1910.

The above-described method of developing screen may also be implemented in the form of a non-transitory recording medium including instructions executable by a computer, such as an application or program module executed by a computer. Non-transitory computer-readable medium can be any available media that can be accessed by a computer and includes both volatile and nonvolatile medium, removable and non-removable media. In addition, non-transitory computer-readable medium may include computer storage medium. Computer storage medium includes both volatile and nonvolatile, removable and non-removable media implemented in any method or technology for storage of information such as computer readable instructions, data structures, program modules or other data.

The above-described method of developing screen may be executed by an application (which may include a program included in a platform or operating system by default installed in the terminal) installed by default in the terminal, and by an application (i.e., program) that a user manually installed in the terminal after downloading from an application store server, or an application providing server such as a web server related to the application or service. In this sense, the above-described method of developing screen may be implemented as an application (i.e., program) installed by default in the terminal or manually installed by a user, and may be recorded in the non-transitory computer-readable recording medium such as the terminal.

While the invention has been described above with reference to exemplary embodiments, it will be understood by those skilled in the art that the invention can be modified and changed in various forms without departing from the concept and scope of the invention described in the appended claims.

What is claimed is:

1. A user interface platform development system, comprising:

a development tool, configured for providing a WYSIWYG-style screen file development environment and generating a screen file source that organizes a user interface platform with structured components, wherein the generated screen file source is in an XML format;

a server, providing resources for developing a screen file with the development tool, and with which developed screen file sources are registered;

a screen source conversion module configured to compile the screen file source in the XML format into a JavaScript (JS) file including a JSON object that contains identical information to the screen file source; and a client, having a client engine to load the JS file of the screen file source that is received from the server as response, and configured for executing in a browser window to provide the user interface platform according to an associated device, wherein the development tool configures the screen file as a single page application type, wherein the screen file is divided into a static resource and a dynamic resource that make up a web page, wherein when loading the web page in a client's browser, the static resource is downloaded only once, and then the dynamic resource is rendered in a partial area, wherein the dynamic resource is a portion of content that includes a portion that must be displayed on a current screen and is set to be displayed through script execution after being loaded and rendered only when requested, wherein the static resource includes common scripts and common resources, and the client engine is a JavaScript-based engine that executes within a rendering process managed by the client's browser, and wherein the client engine parses the JSON object included in the JS file to dynamically render the user interface platform on the client's browser.

2. The user interface platform development system of claim 1, wherein the screen file has an effective scope set for all unit screens constituting the web page, so that an entire web page is implemented as one single page.

3. The user interface platform development system of claim 1, wherein in a screen execution process performed by the client, creating the browser window, loading and executing the client engine, loading and executing the common script, and loading the common resource are executed only once, and loading a screen resource, rendering the screen, and executing a screen script are subsequently repeated by request.

4. The user interface platform development system of claim 1, wherein the structured components comprise at least one of Page component, user defined component (UDC), Project UDC, and MSA UDC.

5. The user interface platform development system of claim 1, wherein the client comprises a MSA message broker configured for corresponding to a microservice architecture and a micro frontend architecture having a cross-MSA resource sharing function.

6. The user interface platform development system of claim 5, wherein the MSA message broker comprises a global message hub which exchanges text messages in an asynchronous manner.

7. The user interface platform development system of claim 6, wherein to prevent security and memory leak issues, the text messages are only allowed in a text format such that only string converted JSON strings are allowed and JSON Objects are not allowed.

* * * * *